United States Patent
Drennen et al.

(10) Patent No.: US 9,815,551 B2
(45) Date of Patent: Nov. 14, 2017

(54) SYSTEMS AND METHODS FOR AIRCRAFT BRAKING AND TAXIING

(71) Applicant: Goodrich Corporation, Charlotte, NC (US)

(72) Inventors: David Drennen, Bellbrook, OH (US); Kevin Rehfus, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 185 days.

(21) Appl. No.: 14/803,658

(22) Filed: Jul. 20, 2015

(65) Prior Publication Data

US 2017/0021920 A1    Jan. 26, 2017

(51) Int. Cl.
| | |
|---|---|
| *B64C 25/44* | (2006.01) |
| *B64C 25/36* | (2006.01) |
| *B64C 25/40* | (2006.01) |
| *B60T 8/17* | (2006.01) |

(52) U.S. Cl.
CPC ............ *B64C 25/36* (2013.01); *B60T 8/1703* (2013.01); *B64C 25/405* (2013.01); *B64C 25/44* (2013.01)

(58) Field of Classification Search
CPC ........ B64C 25/405; B64C 25/44; B64C 25/36
See application file for complete search history.

(56) References Cited

U.S. PATENT DOCUMENTS

| | | |
|---|---|---|
| 8,579,229 B2 | 11/2013 | Nierlich |
| 9,016,620 B2 | 4/2015 | Wilson |
| 9,017,219 B2 | 4/2015 | Cahill |
| 2006/0065779 A1 | 3/2006 | McCoskey et al. |
| 2007/0284939 A1 | 12/2007 | Charles et al. |
| 2011/0156472 A1* | 6/2011 | Bucheton .............. B64C 25/405 301/6.2 |
| 2011/0198163 A1 | 8/2011 | Hanlon et al. |
| 2013/0292992 A1 | 11/2013 | Cahill |
| 2013/0311005 A1* | 11/2013 | Cahill ................... B60T 13/741 701/3 |
| 2014/0157906 A1* | 6/2014 | Freshour ................... G01L 5/28 73/774 |
| 2014/0332622 A1 | 11/2014 | Charles et al. |

FOREIGN PATENT DOCUMENTS

| | | |
|---|---|---|
| EP | 2236419 | 10/2010 |
| WO | 2009125213 | 10/2009 |

OTHER PUBLICATIONS

Extended European Search Report dated Dec. 23, 2016 in European Application No. 16180414.1, 9 pages.

* cited by examiner

*Primary Examiner* — Sherry Estremsky
*Assistant Examiner* — Lillian Nguyen
(74) *Attorney, Agent, or Firm* — Snell & Wilmer L.L.P.

(57) ABSTRACT

Systems and methods are disclosed for aircraft braking and taxiing systems for use in, for example, an aircraft. In this regard, a system may comprise an electric motor and a clutch. The electric motor may include a first output shaft and a second output shaft. The clutch may selectively engaging the motor to at least one of a driver transmission and a brake transmission, wherein, in response to engagement with the driver transmission, the electric motor drives, exclusively, an aircraft wheel via the first output shaft, wherein, in response to engagement with the brake transmission, the electric motor drives, exclusively, a brake clamping system via the second output shaft to apply force to an aircraft brake disk stack.

19 Claims, 5 Drawing Sheets

SYSTEMS AND METHODS FOR AIRCRAFT BRAKING AND TAXIING

FIELD

The present disclosure is related to systems and methods for aircraft braking and taxiing.

BACKGROUND

Aircraft often include a braking system that slows the aircraft wheels. Aircraft braking systems are used, for example, during a landing operation or a rejected takeoff ("RTO"). Many aircraft use jet engines or propellers to provide the force needed to taxi (i.e., move the aircraft while on the ground). Taxiing is useful for aircraft travel while on the ground, for example, taxiing to and from a gate and a runway. Jet engines are not as fuel efficient in such low speed applications, resulting in relatively high fuel consumption and excess noise.

SUMMARY

Systems and methods disclosed herein may be useful for use in aircraft braking and taxiing. According to various embodiments, a braking and taxiing system is provided comprising an electric motor, wherein said electric motor comprises a first output shaft and a second output shaft, a clutch for selectively engaging the motor to at least one of a driver transmission and a brake transmission. The electric motor may drive, exclusively, an aircraft wheel via the first output shaft in response to engagement with the driver transmission. The electric motor may drive, exclusively, a brake clamping system via the second output shaft to apply force to an aircraft brake disk stack in response to engagement with the brake transmission.

In a further embodiment of any of the foregoing embodiments, the brake clamping system may comprise the brake transmission, a ballscrew and a ram. In various embodiments, the first output shaft and the second output shaft may be in concentric alignment. In various embodiments, the driver transmission may be located on the opposite side of the electric motor as the brake transmission, wherein the electric motor, the driver transmission, and the brake transmission are in concentric alignment. In various embodiments, the clutch may include a neutral position, wherein, in response to engagement in the neutral position, the electric motor may spin freely. In various embodiments, the driver transmission may drive rotation of the aircraft wheel. In various embodiments, at least one of the driver transmission and the brake transmission may comprise a high gear ratio transmission with a gear ratio from about 30:1 to about 110:1. In various embodiments, at least one of the driver transmission and the brake transmission may include a planetary gear set. In various embodiments, a controller may provide a command to the electric motor. In various embodiments, an input device may provide input to the brake control unit.

In various embodiments, a system is provided comprising an aircraft wheel comprising a mating portion for mating with a driver transmission, the aircraft wheel coupled to an aircraft brake, and a clutch for selectively engaging an electric motor to at least one of the driver transmission and a brake transmission. The aircraft brake may comprise a brake clamping system for selectively engaging a brake disk stack. The driver transmission may be located on the opposite side of the electric motor as the brake transmission.

In a further embodiment of any of the foregoing embodiments, in response to engagement with the brake transmission, the electric motor may drive the brake clamping system, wherein the brake clamping system comprises the brake transmission, a ballscrew and a ram. In various embodiments, in response to engagement with the driver transmission, the electric motor may drive the aircraft wheel. In various embodiments, the clutch may include a neutral position, wherein, in response to engagement in the neutral position, the electric motor may spin freely. In various embodiments, the mating portion may be located along an interior circumference of the aircraft wheel. In various embodiments, the mating portion may comprise a geared portion. In various embodiments, the mating portion may be integral to the aircraft wheel. In various embodiments, the mating portion may be detachably coupled to the aircraft wheel.

In various embodiments, a method is provided comprising sending a driver signal to a braking and taxiing system. The braking and taxiing system may comprise a clutch and a motor in concentric alignment with a driver transmission and in concentric alignment with a brake transmission. The method may further comprise selectively engaging, by the clutch, at least one of a first position, a second position, and a third position in response to the driver signal. A second output shaft of the electric motor may be coupled to the brake transmission via the clutch in response to engagement with the first position. A first output shaft of the electric motor may be engaged with the driver transmission via the clutch in response to engagement with the second position. The first output shaft and the second output shaft may spin freely, i.e. not be mechanically coupled to another component, in response to engagement with the third position.

In various embodiments, the method may additionally and/or alternatively comprise driving a brake clamping system in response to engagement with the first position, wherein the brake clamping system comprises the brake transmission, a ballscrew, and a ram, wherein in response to engagement with the second position, the motor drives an aircraft wheel.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

Figure 1:
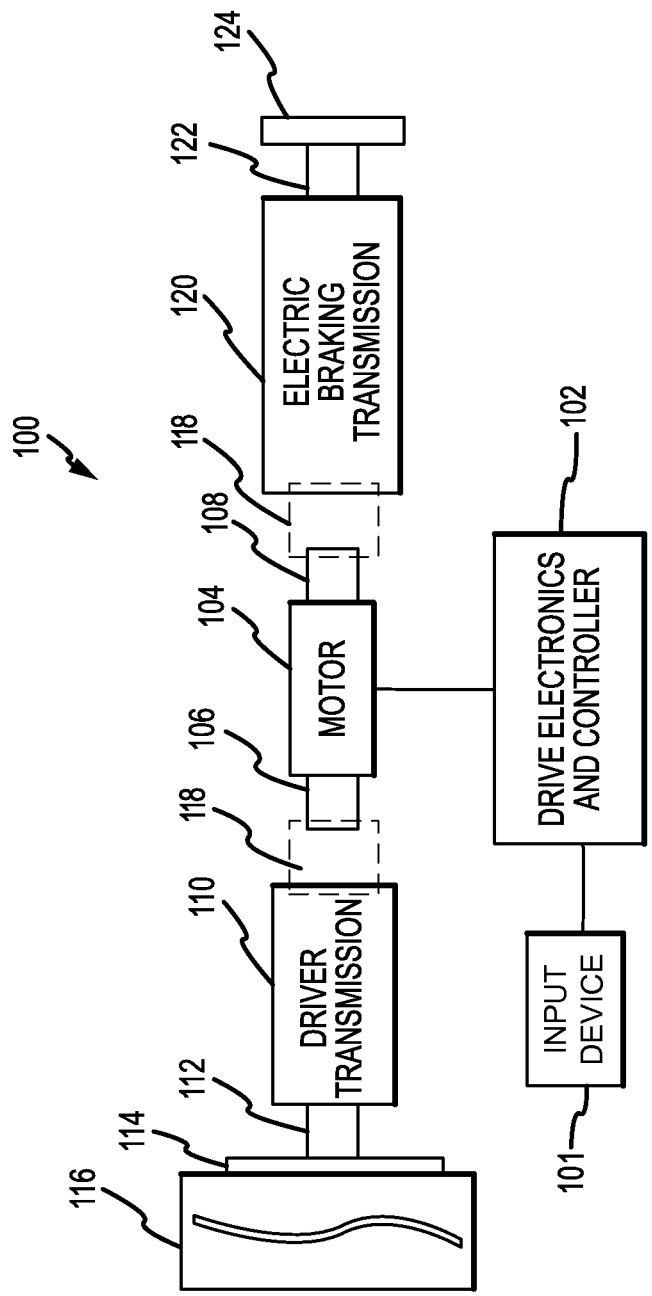
FIG. 1 illustrates a braking and taxiing system in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "electronic communication" means communication of electronic signals with physical coupling (e.g., "electrical communication" or "electrically coupled"), without physical coupling and via an electromagnetic field (e.g., "inductive communication" or "inductively coupled" or "inductive coupling"), or without physical coupling and via an electric field (e.g., "RF communication" or "wireless communication").

Systems and methods disclosed herein may be useful for braking and taxiing systems for use in aircraft. Aircraft may comprise one or more types of aircraft wheel and brake assemblies. For example, an aircraft wheel and brake assembly may comprise a non-rotatable wheel support, a wheel mounted to the wheel support for rotation, and a brake disk stack. The brake stack may have front and rear axial ends and alternating rotor and stator disks mounted with respect to the wheel support and wheel for relative axial movement. Each rotor disk may be coupled to the wheel for rotation therewith and each stator disk is coupled to the wheel support against rotation. A back plate may be located at the rear end of the disk pack and a brake head may be located at the front end. The brake head may house one or more actuator rams that extend to compress the brake disk stack against the back plate, or the brake disk stack may be compressed by other means. Torque is taken out by the stator disks through a static torque tube or the like.

Actuator rams may be electrically operated actuator rams or hydraulically operated actuator rams, although some brakes may use pneumatically operated actuator rams. In brake systems that employ fluid powered (hydraulic or pneumatic power) actuator rams, the actuator ram may be coupled to a power source via a brake servo valve ("BSV") and a shutoff valve ("SOV"). The SOV effectively functions as a shutoff valve, wherein in a first position (e.g., an armed position), fluid pressure is permitted to pass through the valve, while in a second position (e.g., a disarmed position) fluid pressure is restricted or prevented from passing through the valve. During normal braking, the SOV is in the armed position, thereby permitting the flow of fluid pressure. The BSV, based on braking commands from the pilot (often via an electronic controller that may implement, for example, anti-skid logic) controls the amount of fluid pressure provided to the actuator ram, and thus, the braking force applied to the wheel. To prevent or minimize unintentional braking (e.g., due to a faulty servo valve) at various times, the SOV is set in the disarmed position, thereby removing or decreasing fluid pressure from the BSV. Since the BSV does not receive sufficient fluid pressure, it cannot provide fluid pressure to the actuator ram, and thus, braking cannot be effected.

In electronic brakes, a brake controller (also referred to as a brake control unit) is coupled to one or more electromechanical actuator controllers ("EMAC") for a brake, which drives one or more electromechanical brake actuators. The brake controller may be in communication with a brake pedal, and thus may control the EMAC in accordance with pilot/copilot braking commands Electromechanical brake actuators may be in physical communication with a brake clamping system. A brake clamping system may provide force to clamp a brake disk stack. For example, a brake clamping system may comprise a rotary force to linear force converter, such as a ballscrew. A ballscrew typically receives rotational force input and converts the rotational force into a linear force. The ballscrew may thus receive rotational input from the electromechanical brake actuators and, in response, linearly drive rams into the brake disk stack, thus effecting braking. A brake clamping system may also comprise a brake transmission to condition torque input to be of suitable magnitude and velocity for the ballscrew.

In various embodiments, an aircraft braking and taxiing system is provided. A braking and taxiing system may provide taxi functionality and braking functionality. In this manner, an electric motor may be used to both effect braking and propel the aircraft during taxiing. In various embodiments, a single electric motor is used to both effect braking and propel the aircraft during taxiing, thus saving weight and cost. In that regard, the electric motor may toggle between providing braking and providing taxiing and, in various embodiments, a neutral position where the electric motor is not engaged to provide either braking or taxiing. It is believed that there would not be a need for an aircraft that is capable of both braking and taxiing at the same time. Indeed, such ability would likely be counterproductive. Thus, the braking and taxiing functionalities may be driven by a common electric motor or electric motors. Various embodiments reduce weight, as it eliminates the need for two electric motors: one for braking and one for taxiing. Moreover, various embodiments reduce testing requirements, as only a single system is tested instead of two. This reduces the cost of testing and reduces time to deploy such a system.

A braking and taxiing system may provide taxiing capability to the aircraft. A braking and taxiing system may comprise one or more electric motors that, through various gear trains (i.e., transmissions), drive the wheels of an aircraft. In this manner, taxiing may be accomplished in a more energy efficient manner with reduced noise. In that regard, a braking and taxiing system may be designed to use a relatively low torque output electric motor coupled to one or more transmissions having high gear ratios, which produce a relatively higher torque output than the input torque. Thus, a braking and taxiing system may be designed with smaller, lighter weight motors that are capable of driving an aircraft, and particularly, larger jet aircraft.

A braking and taxiing system may provide braking capability. An electric motor may, through one or more transmissions, engage a brake clamping system to place a brake disk stack into forceful engagement, thus effecting braking. In that regard, the electric motor may, through one or more transmissions, engage a force converter such as a ballscrew. In various embodiments, the electric motor, engages a transmission which in turn engages a brake clamping system.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

With reference to FIG. 1, braking and taxiing system 100 is shown in accordance with various embodiments. Drive electronics controller 102 is shown in electrical communication with motor 104. Drive electronics controller 102 may comprise hardware and/or software that implement logic to control motor 104. Drive electronics controller 102 may comprise a non-transitory, tangible computer-readable medium. Drive electronics controller 102 may also comprise electronic drivers that provide drive signals to motor 104. Drive electronics controller 102 may reside in a brake control unit. It is contemplated that multiple brake control units may be employed for redundancy purposes and the like. The brake control unit may receive commands from one or more cockpit instruments. A cockpit instrument may comprise any instrument in the aircraft that allows for the input or display of a command or status. For example, a pedal in the cockpit may be operated by a pilot to produce braking commands. A lever, pedal, dial, switch, or other command input device 101 may be used to command taxiing, including information such as desired taxi speed. Drive electronics controller 102 may receive one or more commands from a cockpit instrument and provide output in accordance with the same. Drive electronics controller 102 may also perform logic to verify the appropriateness of the received command. Stated another way, drive electronics controller 102 may be configured to perform error handling. For example, a processor may erroneously receive a command for taxiing during landing. Drive electronics controller 102 may become aware of landing through indicators such as weight on wheels, high wheel speed, and high concurrent braking command, among others. Drive electronics controller 102 may thus determine that the command for taxiing is an error (e.g., human error or electrical error) and ignore the command.

Motor 104 comprises an electric motor. Motor 104 may comprise any suitable electric motor such as a brushless DC motor. Brushed DC motors and brushless AC motors are also contemplated herein. Motor 104 may receive drive signals from drive electronics controller 102 that may cause a shaft in motor 104 to turn in response to the drive signals. Motor 104 may provide a mechanical torque input into driver transmission 110. Motor 104 may provide a mechanical torque input into brake transmission 120.

Motor 104 may comprise a first output shaft 106 and a second output shaft 108. In various embodiments, first output shaft 106 and second output shaft 108 may comprise the same shaft. In various embodiments, first output shaft 106 and second output shaft 108 may comprise two separate shafts. First output shaft 106 may be coupled to driver transmission 110 via clutch 118. Clutch 118 may comprise any suitable clutch. Clutch 118 selectively engages and disengages first output shaft 106 from driver transmission 110. In various embodiments, first output shaft 106 and driver transmission 110 mate via meshing gears, though other suitable mechanical matings are contemplated herein. Clutch 118 may be mechanically actuated (ie, selectively engaged and disengaged) or may be actuated using hydraulics or electronics such as a transmission solenoid. Clutch 118 may be mechanically actuated in response to one or more gear teeth sensors that detect the position of gear teeth and thus are able to determine when two or more gears align.

Driver transmission 110 may be coupled to aircraft wheel 116 via pinion gear 112 and wheel ring gear 114. In various embodiments, pinion gear 112 and wheel ring gear 114 may mate via meshing gears, though other suitable mechanical matings are contemplated herein. Wheel ring gear 114 may be located along an interior circumference of aircraft wheel 116. Wheel ring gear 114 may comprise an annular ring including one or more gear teeth along an interior circumference of the annular ring. When attached to aircraft wheel 116, wheel ring gear 114 may comprise a mating portion by which an adjacent gear may drive rotation of aircraft wheel 116 via meshing gears as described herein. Wheel ring gear 114 may be located adjacent to or close to the aircraft wheel tire. To increase torque, it is desirable for the mating of the driver transmission 110 and aircraft wheel 116 to occur at a point that tends to be radially further from the rotational axis of the aircraft wheel. In various embodiments, wheel ring gear 114 may be detachably coupled to aircraft wheel 116. In various embodiments, wheel ring gear 114 may be attached to aircraft wheel 116 via any suitable method including via a bolt and/or weld. In various embodiments, wheel ring gear 114 may be integral to aircraft wheel 116. Integral as used herein may refer to two features that are manufactured from the same piece of material and therefore lack a joint or other joinery feature. For example, wheel ring gear 114 may be manufactured via a subtractive machining process during machining of aircraft wheel 116. Accordingly, aircraft wheel 116 may comprise a mating portion that may mate to driver transmission 110 to transmit rotational force from driver transmission 110 to aircraft wheel 116. As described herein, the mating portion of aircraft wheel 116 may be a geared portion along an inner circumference of aircraft wheel 116. However, in various embodiments the mating portion of aircraft wheel 116 may comprise any other suitable mating portion.

Second output shaft 108 may be coupled to brake transmission 120 via clutch 118. Clutch 118 selectively engages and disengages second output shaft 108 from brake transmission 120. In various embodiments, second output shaft 108 and brake transmission 120 may mate via meshing gears, though other suitable mechanical matings are contemplated herein. Clutch 118 may be mechanically actuated (ie, selectively engaged and disengaged) or may be actuated using hydraulics or electronics such as a transmission solenoid. Clutch 118 may be mechanically actuated in response to one or more gear teeth sensors that detect the position of gear teeth and thus are able to determine when two or more gears align.

Clutch 118 may be actuated to momentarily separate first output shaft 106 and second output shaft 108 from other components. Clutch 118 may be engaged in one of three positions. In a first position, clutch 118 is engaged with brake transmission 120. In a second position, clutch 118 is engaged with driver transmission 110. In a third position, clutch 118 is in a neutral position. A neutral position may be a position where first output shaft 106 and second output shaft 108 are not mechanically coupled to another component. Thus, in a neutral position, first output shaft 106 and second output shaft 108 may be allowed to spin freely.

Brake transmission 120 may be coupled to ballscrew 122. Ballscrew 122 receives rotational force from brake transmission 120 and converts the rotational force to linear force. The linear force may be applied to pressure plate 124 of an aircraft brake. Brake transmission 120, ballscrew 122, and a ram may comprise a brake clamping system. In this regard, drive electronics controller 102 may operate a brake in accordance with received input commands using the same electric motor used to provide a motive force for taxiing.

Motor 104 may drive, exclusively, aircraft wheel 116 via first output shaft 106 in response to engagement with driver transmission 110. Motor 104 may drive, exclusively, a brake clamping system via second output shaft 108 in response to engagement with brake transmission 120. Accordingly, when engaged to driver transmission 110, motor 104 is disengaged with brake transmission 120. Furthermore, when engaged to brake transmission 120, motor 104 is disengaged with driver transmission 110. Thus, motor 104 may be configured such that it may not drive brake transmission 120 and driver transmission 110 at the same time. Thus, the term exclusively as used herein may refer to a motor which is configured to engage only one transmission at a time, and thereby may not drive multiple transmissions at the same time.

Driver transmission 110 may comprise a gear train that has a high gear ratio. Accordingly, driver transmission 110 may be referred to herein as a high gear ratio transmission. A high gear ratio, as used herein, may be from about 30:1 to about 110:1, more preferably from about 40:1 to about 80:1, and more preferably about 54:1. As described below, a high gear ratio transmission may have a variable final gear ratio, so the high gear ratio transmission may vary from one ratio to another depending upon configuration. Any transmission that has at least one final gear ratio from about 30:1 to about 110:1 may be considered a high gear ratio transmission, even though the high gear ratio transmission may be adjusted to variably have a gear ratio outside such range. In such a manner, a gear ratio of 54:1 may receive a torque input $\tau_I$ of 3 Nm and produce torque output $\tau_o$ of 162 Nm. The use of a high gear ratio transmission thus enables the use of lower torque producing motors to produce higher torque outputs. The power and torque output of motor 104 may thus be selected in accordance with anticipated loads and gear ratios used, among other considerations.

The output of motor 104 may be selected in accordance with the force needed to move an aircraft. For example, the force required to move an aircraft may be represented by the below, equation, where N is the normal force (weight of aircraft) and μ is the rolling resistance of the aircraft:

$$F=\mu \cdot N$$

For an 80,000 kg (176,370 lb) aircraft with a rolling resistance of 0.01, F=800 kg (1,763.7 lb). This force may be divided by the number of wheels of the aircraft that contain a parking brake system. For example, an aircraft may have four wheels, each with a parking brake system. Thus, each tire must exert 200 kg (440.9 lb) of force for the aircraft to move in response to the parking brake being disengaged. For an aircraft wheel with a 0.5 m (1.64 ft) radius, the torque required to produce 200 kg (440.9 lb) is about 983 Nm (725 ft-lb). The gear ratio of driver transmission 110 and the inertia of motor 104 may be selected to overcome such force.

In various embodiments, braking and taxiing system 100 may require minimal weight increase. In various embodiments, braking and taxiing system 100 may require minimal increase to existing package space allocated for hydraulic or electric brakes. Package space may be the space that braking and taxiing system 100 occupy when in an installed position. Stated another way, braking and taxiing system 100 may be configured to occupy minimal additional space in addition to an existing electric or hydraulic brake.

Figure 2:
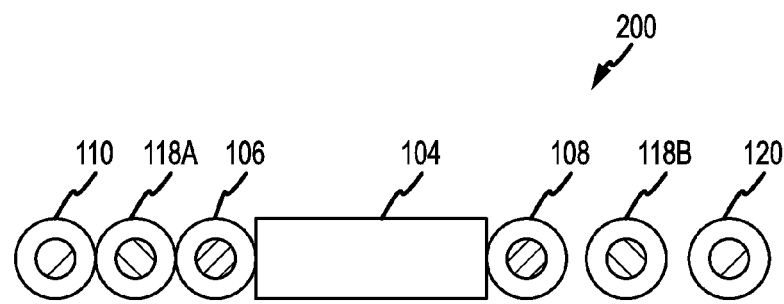
FIG. 2 illustrates an expanded view of a portion of the braking and taxiing system of FIG. 1, in accordance with various embodiments.
Figure 3:
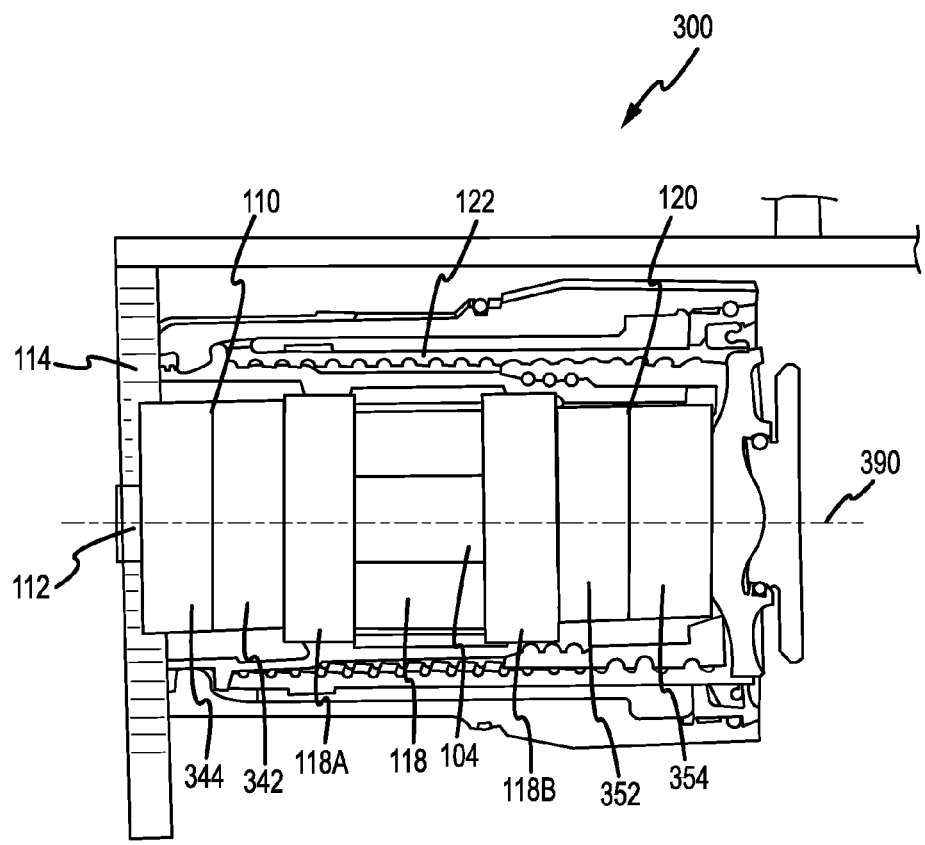
FIG. 3 illustrates a partial schematic, cross-section view of a braking and taxiing system in accordance with various embodiments.

With reference to FIG. 2 and FIG. 3, elements with like element numbering as depicted in FIG. 1 are intended to be the same and will not necessarily be repeated for the sake of clarity.

With reference to FIG. 2, clutch assembly 200 is shown, according to various embodiments. Clutch assembly 200 is an expanded view of the coupling between first output shaft 106 and driver transmission 110, and second output shaft 108 and brake transmission 120. First output shaft 106 provides the rotational output of motor 104. In various embodiments, FIG. 2 illustrates clutch gear 118A in an engaged position. When in an engaged position, clutch gear 118A receives torque input from first output shaft 106. Clutch gear 118A is shown engaged with first output shaft 106 and driver transmission 110, thereby coupling first output shaft 106 and driver transmission 110. Clutch gear 118A is selectively actuated, so clutch gear 118A may be disengaged to remove first output shaft 106 from contact with driver transmission 110. With momentary reference to FIG. 1, such engagement may be in response to commands from drive electronics controller 102 or other aircraft components.

In various embodiments, clutch gear 118B is shown disengaged with second output shaft 108 and brake transmission 120. Clutch gear 118B is selectively actuated, so clutch gear 118B may be disengaged to remove second output shaft 108 from contact with brake transmission 120. With momentary reference to FIG. 1, such engagement may be in response to commands from drive electronics controller 102 or other aircraft components. Clutch gear 118A and 118B comprise clutch 118, shown in FIG. 1. Clutch gear 118A and 118B are configured so that either clutch gear 118A is engaged with driver transmission 110, clutch gear 118B is engaged with brake transmission 120, or clutch gear 118A and clutch gear 118B are not engaged with both brake transmission 120 and driver transmission 110. In that regard, when clutch gear 118A and clutch gear 118B are not engaged with both brake transmission 120 and driver transmission 110, clutch 118 is in a neutral position.

With reference to FIG. 3, elements with like element numbering as depicted in FIG. 2 are intended to be the same and will not necessarily be repeated for the sake of clarity.

In various embodiments, with reference to FIG. 3, brake and taxiing system 300 is illustrated. Motor 104, clutch 118, driver transmission 110 and brake transmission 120 are shown schematically whereas a cross-section view illustrates the remaining components. Driver transmission 110 may comprise a first stage driver transmission (FSDT) 342 and a second stage driver transmission (SSDT) 344. Accordingly, driver transmission 110 may comprise a first stage and a second stage. FSDT 342 may be a planetary (or epicyclic)

gear system. In various embodiments, FSDT 342 may have a gear ratio greater than one to one (1:1), and in further embodiments, a gear ratio between about three to one (3:1) and fifteen to one (15:1), and in various embodiments, a gear ratio of about six to one (6:1). In other words, if FSDT 342 has a gear ratio of about six to one, the input of FSDT 342 may have an angular velocity that is about six times greater than the output of FSDT 342. Furthermore, the gear ratio of a gear system is linearly proportional to the torque at work of the gear system. Stated another way, if FSDT 342 has a gear ratio of 6:1, then the torque at work of the output is six times greater than the torque applied at the input. Accordingly, an output (shaft) of FSDT 342 may have a lower angular velocity than an input (shaft) of FSDT 342 and the torque applied at an output (shaft) of FSDT 342 may be greater than the torque applied at an input (shaft) of FSDT 342.

In various embodiments, SSDT 344 may be similar to FSDT 342. In various embodiments, SSDT 344 may have a gear ratio greater than one to one (1:1), and in further embodiments, a gear ratio between about three to one (3:1) and fifteen to one (15:1), and in various embodiments, a gear ratio of about nine to one (9:1). In various embodiments, FSDT 342 and SSDT 344 may be concentrically located about centerline axis 390. In various embodiments, driver transmission 110 may comprise a gear ratio greater than one to one (1:1), and in further embodiments, a gear ratio between about forty to one (40:1) and seventy to one (70:1), and in various embodiments, a gear ratio of about fifty four to one (54:1). For example, if FSDT 342 and SSDT 344 comprise a gear ratio of 6:1 and 9:1 respectively, then driver transmission 110 would comprise a gear ratio of 6 times 9 to one (or 54:1). Driver transmission 110 may comprise any suitable gear train for aircraft propulsion. In various embodiments, driver transmission 110 is a planetary gear system as discussed herein.

In various embodiments, pinion gear 112 may be coupled to the output shaft of driver transmission 110. In various embodiments, pinion gear 112 may be an output shaft of driver transmission 110. Pinion gear 112 may be concentrically located about centerline axis 390. Motor 104 may be concentrically located about centerline axis 390.

In various embodiments, brake transmission 120 may comprise first stage brake transmission (FSBT) 352 and second stage brake transmission (SSBT) 354. FSBT 352 may be similar to FSDT 342. SSBT 354 may be similar to SSDT 344. Brake transmission 120 may be similar to driver transmission 110. Brake transmission 120 may be concentrically located about centerline axis 390.

In various embodiments, ballscrew 122 may be concentrically located about centerline axis 390. As previously described, brake transmission 120 may be coupled to ballscrew 122. Driver transmission 110 may be located on the opposite side of motor 104 as brake transmission 120.

Figure 4:
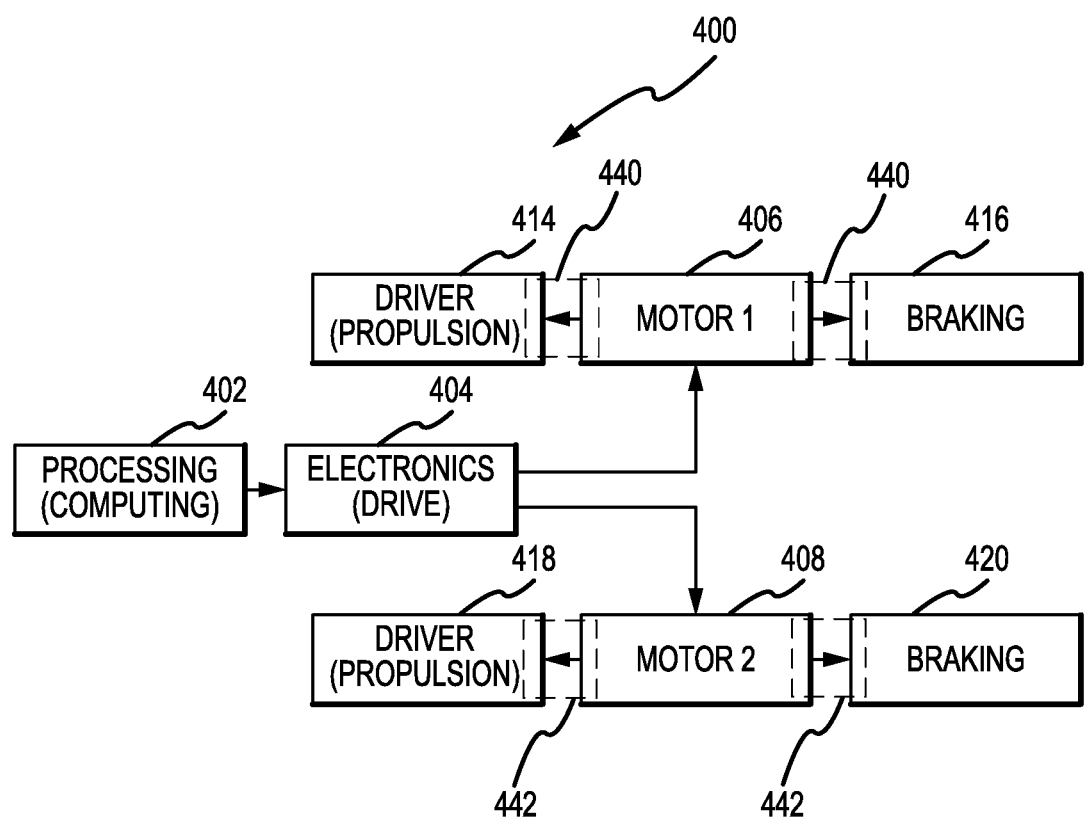
FIG. 4 illustrates a braking and taxiing system in accordance with various embodiments.

With reference to FIG. 4, a functional diagram of aircraft braking and taxiing system 400 is shown, according to various embodiments. Aircraft braking and taxiing system 400 comprises a system that may be coupled to a single wheel. Processor 402 comprises a processor and a non-transitory, tangible computer-readable medium that implements logic to control the parking brake system. Processor 402 may reside in a brake control unit. It is contemplated that multiple brake control units may be employed for redundancy purposes and the like. The brake control unit may receive commands from one or more cockpit instruments. A cockpit instrument may comprise any instrument in the aircraft that allows for the input or display of a command or status. For example, a pedal in the cockpit may be operated by a pilot to produce braking commands. A lever, pedal, dial, switch, or other command input device may be used to command taxiing, including information such as desired taxi speed. Processor 402 may receive one or more commands from a cockpit instrument and provide output in accordance with the same. Processor 402 may also perform logic to verify the appropriateness of the received command. For example, a processor may receive a command for taxiing during landing (landing is known to occur through indicators such as weight on wheels, high wheel speed, and high concurrent braking command, among others). Processor 402 may thus determine that the command for taxiing is an error (e.g., human error or electrical error) and ignore the command. Processor 402 may be similar to drive electronics controller 102 described in FIG. 1.

Processor 402 commands electronic drive 404. Electronic drive 404 receives commands from processor 402 and produces drive signals for motors 406 and 408 in response to and in accordance with the command signals. It is contemplated that electronic drive 404 may drive one or more motors. In various embodiments, four motors may be coupled to each aircraft wheel, though in various embodiments at least three to six motors are used. Drive 404 may be similar to drive electronics controller 102 described in FIG. 1.

Motors 406 and 408 receive the drive signals from electronic drive 404 and cause motors 406 and 408 to turn in response to the drive signals. As discussed herein, motors 406 and 408 may be brushless DC motors though the use of any electric motor is contemplated herein. Motor 406 provides a mechanical torque input into driver transmission 414 and brake transmission 416. Motor 408 provides a mechanical torque input into driver transmission 418 and brake transmission 420. Transmissions 414, 416, 418, and 420 may comprise high gear ratio transmissions having gear ratios of, for example, in the range of 40:1 to 80:1.

A first clutch 440 couples motor 406 with driver transmission 414. First clutch 440 may be similar to clutch 118 as described in FIG. 1. The first clutch 440 operates to selectively engage motor 406 with driver transmission. Such engagement may be in response to commands from processor 402 or other aircraft components. Driver transmission 414 may be engaged to an aircraft wheel via a mating portion of the aircraft wheel. For example, driver transmission 414 may comprise a gear that mates with a geared portion of the aircraft wheel.

The first clutch 440 couples motor 406 with brake transmission 416. The first clutch 440 operates to selectively engage motor 406 with brake transmission 416. Such engagement may be in response to commands from processor 402 or other aircraft components. Brake transmission 416 may be coupled to a ballscrew that is coupled to a ram. Rotational input from brake transmission 416 is converted to linear force by the ballscrew, which in turn exerts force upon a brake disk stack through the ram. Brake transmission 416, the ballscrew, and the ram may comprise a brake clamping system.

A second clutch 442 may couple motor 408 with driver transmission 418. The second clutch 442 may operate to selectively engage motor 408 with driver transmission 418. Such engagement may be in response to commands from processor 402 or other aircraft components. Driver transmission 418 is engaged to the same aircraft wheel as driver transmission 414 via a mating portion of the aircraft wheel.

The second clutch 442 may couple motor 408 with brake transmission 420. The second clutch 442 may operate to selectively engage motor 408 with brake transmission 420. Such engagement may be in response to commands from processor 402 or other aircraft components. Brake transmission 420 may be coupled to a ballscrew that is coupled to a ram. Rotational input from brake transmission 420 is converted to linear force by the ballscrew, which in turn exerts force upon the brake disk stack through the ram. Both brake transmission 420 and brake transmission 416 exert force (through, for example a ballscrew), on the same brake disk stack. Brake transmission 420, the ballscrew, and the ram may comprise a brake clamping system.

Figure 5:
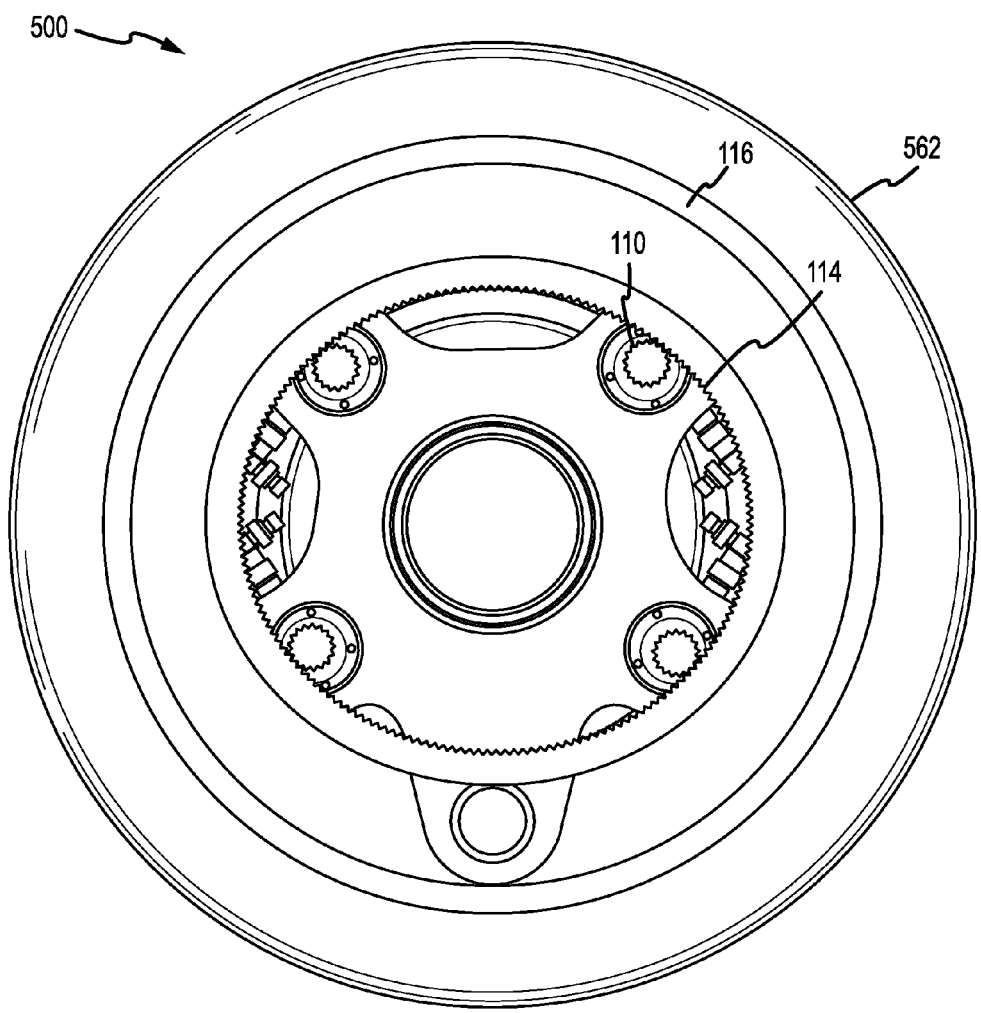
FIG. 5 illustrates a braking and taxiing system installed on an individual aircraft wheel in accordance with various embodiments.

With reference to FIG. 5, elements with like element numbering as depicted in FIG. 1 are intended to be the same and will not necessarily be repeated for the sake of clarity.

With reference to FIG. 5, a braking and taxiing system 500 installed on a wheel is shown, according to various embodiments. Braking and taxiing system 500 may include a plurality of driver transmissions, such as driver transmission 110, engaged with wheel ring gear 114 of aircraft wheel 116. As described herein, driver transmission 110 may be coupled to wheel ring gear 114 via meshing gears. In such position, an electric motor may provide a motive force to effect taxiing. A tire 562 may be coupled to aircraft wheel 116.

Figure 6:
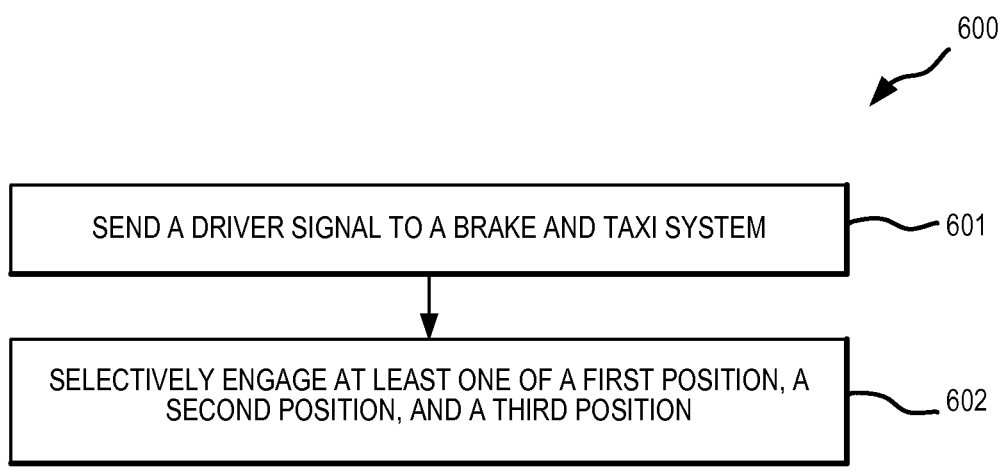
FIG. 6 illustrates a method for actuating a braking and taxiing system in accordance with various embodiments.

With reference to FIG. 6, according to various embodiments, method 600 for actuating a braking and taxiing system may include sending a driver signal to a brake and taxi system in step 601. Step 602 may include selectively engaging at least one of a first position, a second position, and a third position.

In various embodiments, and with further reference to FIG. 1 and FIG. 4, step 601 may include sending the driver signal produced by electronic drive 404 to braking and taxiing system 100, the braking and taxiing system 100 comprising clutch 118, motor 104, driver transmission 110, and brake transmission 120. In various embodiments, motor 104 may be in concentric alignment with driver transmission 110 and in concentric alignment with brake transmission 120. Step 602 may include selectively engaging, by clutch 118, at least one of a first position, a second position, and a third position in response to the driver signal. Second output shaft 108 of electric motor 104 may be coupled to brake transmission 120 via clutch 118 in response to engagement with the first position. First output shaft 106 of electric motor 104 may be engaged with driver transmission 110 via the clutch 118 in response to engagement with the second position. First output shaft 106 and second output shaft 108 may not be mechanically coupled to any other component in response to engagement with the third position.

In various embodiments, during taxiing, a pilot may cease to command further taxiing, but not command braking. Accordingly, the pilot intends to allow the aircraft to "coast." In various embodiments, the electric motor remains mechanically engaged with aircraft wheel. In this regard, the reflected inertia of the electric motor provides a braking effect on the aircraft wheel. In various embodiments, however, the electric motor may disengage from the aircraft wheel, for example, by shifting into a neutral position. Thus, aircraft wheel is allowed to rotate without the reflected inertia of the electric motor, and thus allowing the aircraft wheel to coast without the braking force provided by the electric motor.

Transmissions disclosed herein may internally comprise one or more clutches. Moreover, transmissions disclosed herein may comprise the ability to variably adjust the final gear ratio. Such adjustment may be accomplished using any suitable configuration. For example, internal clutches may be used to select different gears internally to affect final gear ratio. Further, continuously variable mechanisms may be used to change final gear ratio. A propulsion transmission may have two variable gear ratios. The first variable gear ratio of a propulsion transmission may be a "low" gear intended to bring an aircraft from a stopped position into motion. The second variable gear ratio of a propulsion transmission may be a "high" gear intended to maintain the aircraft within a particular speed range. However, in various embodiments, a continuously variable propulsion transmission may be used. Variable adjustment of final gear ratio may be controlled electronically and/or mechanically and/or hydraulically. The aforementioned features may be included in any transmission disclosed herein to tune final gear ratio, input/output torque and input/output rotational velocity. While the transmissions disclosed herein may be primarily comprised of gears, the transmissions contemplated herein may include one or more other modes of torque transmission such as belts, chains, levers, pulleys, and the like.

In various embodiments, as described above, a clutch may be engaged or disengaged based upon input from one or more gear tooth sensors or the like. A gear tooth sensor may sense the position of a gear tooth, for example, using a Hall Effect type sensor. The gear tooth position information may be sent to the brake control unit for processing. At a moment when two gears align, the clutch may be engaged to mate the two gears together. In this regard, a smooth shift is accomplished. Thus, any gear contemplated herein may have an associated gear tooth sensor which may facilitate the engagement and disengagement of a clutch that selectively couples two or more gears.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A braking and taxiing system comprising:
   an electric motor, wherein said electric motor comprises a first output shaft and a second output shaft,
   a clutch for selectively engaging the electric motor to at least one of a driver transmission and a brake transmission,
   wherein, in response to engagement with the driver transmission, the electric motor drives, exclusively, an aircraft wheel via the first output shaft,
   wherein, in response to engagement with the brake transmission, the electric motor drives, exclusively, a brake clamping system via the second output shaft to apply force to an aircraft brake disk stack,
   wherein the driver transmission is located on the opposite side of the electric motor as the brake transmission,
   wherein the electric motor, the driver transmission, and the brake transmission are in concentric alignment.

2. The system of claim 1, wherein the brake clamping system comprises the brake transmission, a ballscrew and a ram.

3. The system of claim 1, wherein the first output shaft and the second output shaft are in concentric alignment.

4. The system of claim 1, wherein the clutch includes a neutral position, wherein, in response to engagement in the neutral position, the electric motor may spin freely.

5. The system of claim 1, wherein the driver transmission drives rotation of the aircraft wheel.

6. The system of claim 1, wherein at least one of the driver transmission and the brake transmission comprise a high gear ratio transmission with a gear ratio from about 30:1 to about 110:1.

7. The system of claim 1, wherein at least one of the driver transmission and the brake transmission includes a planetary gear set.

8. The system of claim 1, wherein a controller provides a command to the electric motor.

9. The system of claim 8, wherein an input device provides input to the controller.

10. A system comprising:
    an aircraft wheel comprising a mating portion for mating with a driver transmission, the aircraft wheel coupled to an aircraft brake;
    the aircraft brake comprising a brake clamping system for selectively engaging a brake disk stack; and
    a clutch for selectively engaging an electric motor to at least one of the driver transmission and a brake transmission, the electric motor comprising a centerline axis,
    wherein the driver transmission is located on the opposite side, axially, of the electric motor as the brake transmission.

11. The system of claim 10, wherein in response to engagement with the brake transmission, the electric motor drives the brake clamping system, wherein the brake clamping system comprises the brake transmission, a ballscrew and a ram.

12. The system of claim 10, wherein in response to engagement with the driver transmission, the electric motor drives the aircraft wheel.

13. The system of claim 10, wherein the clutch includes a neutral position, wherein, in response to engagement in the neutral position, the electric motor may spin freely.

14. The system of claim 10, wherein the mating portion is located along an interior circumference of the aircraft wheel.

15. The system of claim 10, wherein the mating portion comprises a geared portion.

16. The system of claim 10, wherein the mating portion is integral to the aircraft wheel.

17. The system of claim 10, wherein the mating portion is detachably coupled to the aircraft wheel.

18. A method comprising:
    sending a driver signal to a braking and taxiing system, the braking and taxiing system comprising a clutch and a motor in concentric alignment with a driver transmission and in concentric alignment with a brake transmission; and
    selectively engaging, by the clutch, at least one of a first position, a second position, and a third position in response to the driver signal,
    wherein, in response to engagement with the first position, a second output shaft of the electric motor is coupled to the brake transmission via the clutch,
    wherein, in response to engagement with the second position, a first output shaft of the electric motor is engaged with the driver transmission via the clutch,
    wherein, in response to engagement with the third position, the first output shaft and the second output shaft may spin freely.

19. The method of claim 18, wherein in response to engagement with the first position, the motor drives a brake clamping system, wherein the brake clamping system comprises the brake transmission, a ballscrew, and a ram, wherein in response to engagement with the second position, the motor drives an aircraft wheel.

* * * * *